A. P. DAVIS.
THERMOSTAT FOR SEARCHLIGHTS.
APPLICATION FILED APR. 13, 1916.

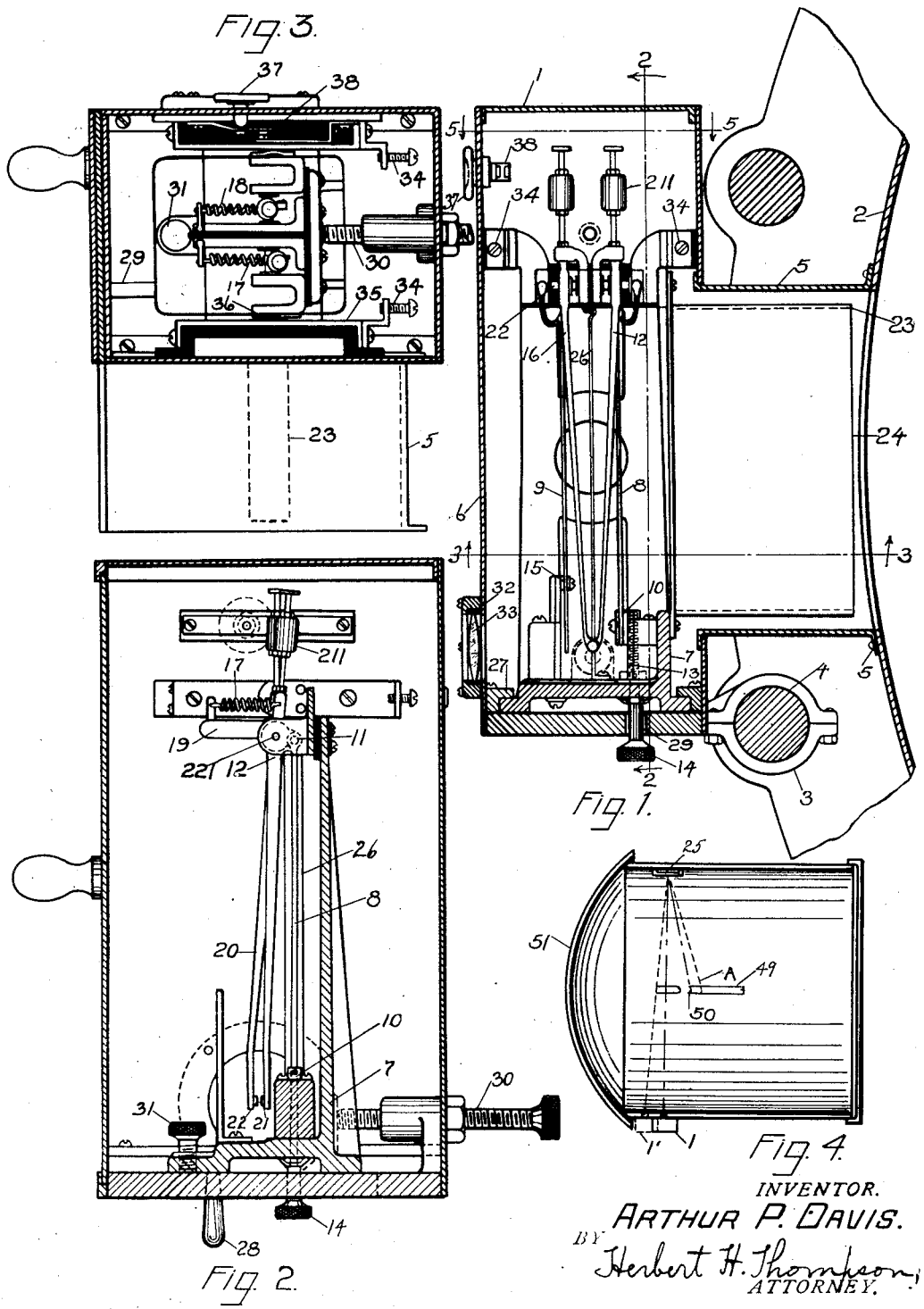

1,433,073.

Patented Oct. 24, 1922.
3 SHEETS—SHEET 2.

INVENTOR.
BY ARTHUR P. DAVIS
Herbert H. Thompson,
ATTORNEY.

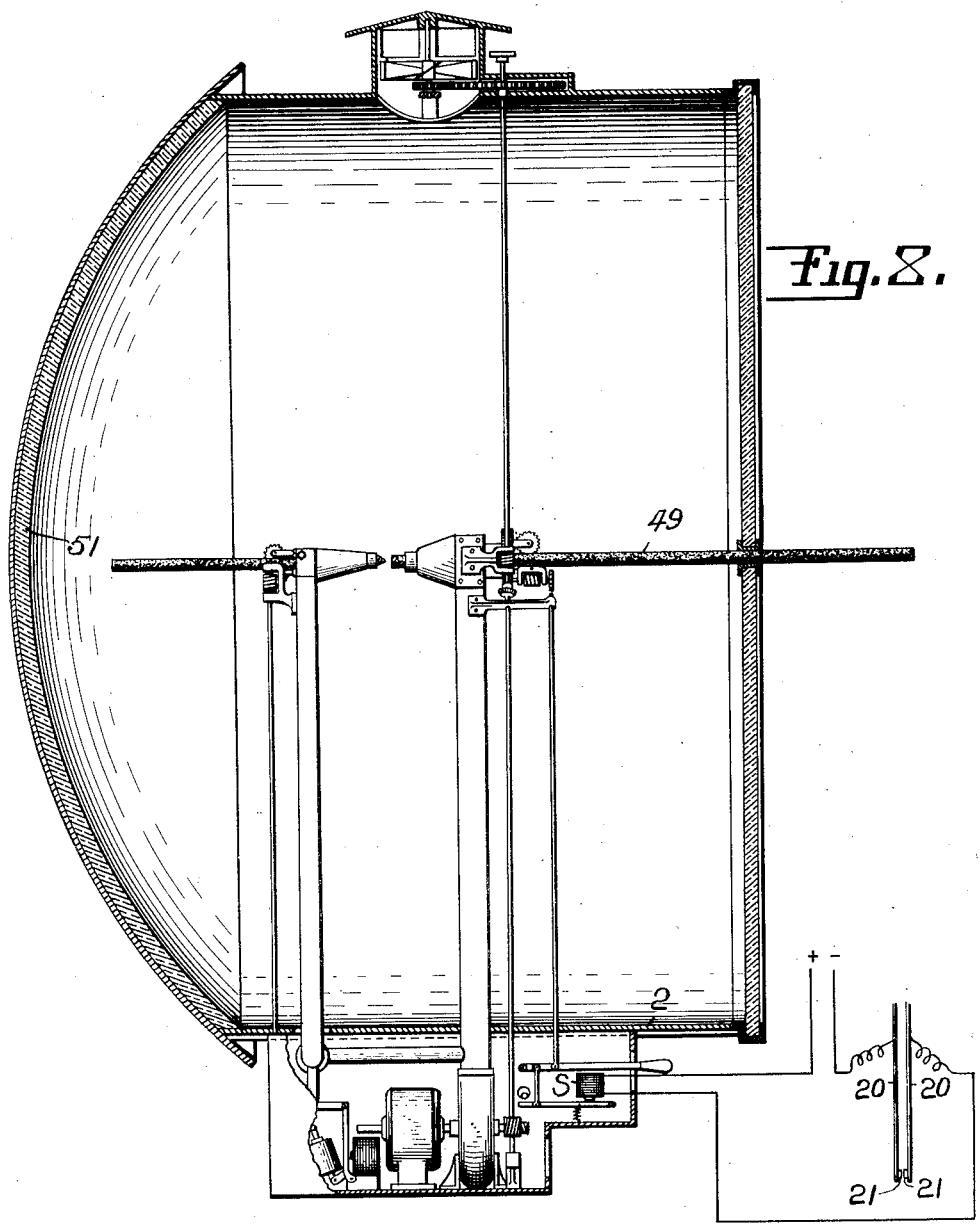

Patented Oct. 24, 1922.

1,433,073

UNITED STATES PATENT OFFICE.

ARTHUR P. DAVIS, OF NEW YORK, N. Y., ASSIGNOR TO SPERRY GYROSCOPE COMPANY OF BROOKLYN, NEW YORK, A CORPORATION OF NEW YORK.

THERMOSTAT FOR SEARCHLIGHTS.

Application filed April 13, 1916. Serial No. 90,829.

*To all whom it may concern:*

Be it known that I, ARTHUR P. DAVIS, a citizen of the United States, residing at 606 West 113th Street, New York city, in the county of New York and State of New York, have invented certain new and useful Improvements in Thermostats for Searchlights, of which the following is a specification.

This invention relates to searchlights or other projector lights which employ as a source of light the electric arc, its object being to devise an automatic means for maintaining the arc and especially the crater of the positive electrode in the focus of the projector. My invention consists of an improved thermostatic device for controlling the feeding of the positive carbon. The device is especially adapted for the type of searchlight shown in the patent to Elmer A. Sperry, No. 1,362,575, dated December 14, 1920, but is well adapted for any type of electric feeding system.

The main object of the invention is to eliminate errors of existing types of thermostats due to changes of temperature of the thermostat itself. In searchlights the temperature changes due to the fact that the searchlight is normally used out of doors and also to heating up of the entire searchlight while the arc is burning, are in many cases very serious and require constant attention on the part of the operator to correct for the errors introduced thereby.

Figure 5:
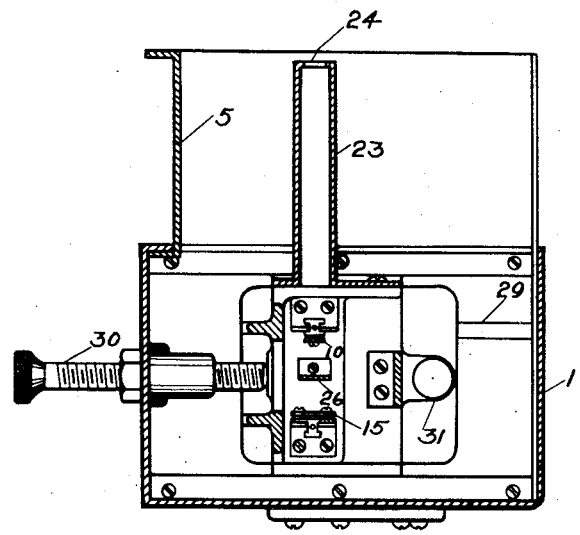
Figure 6:
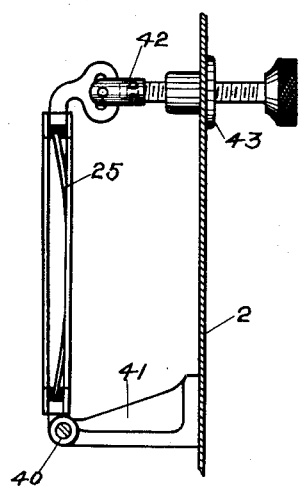
Figure 7:
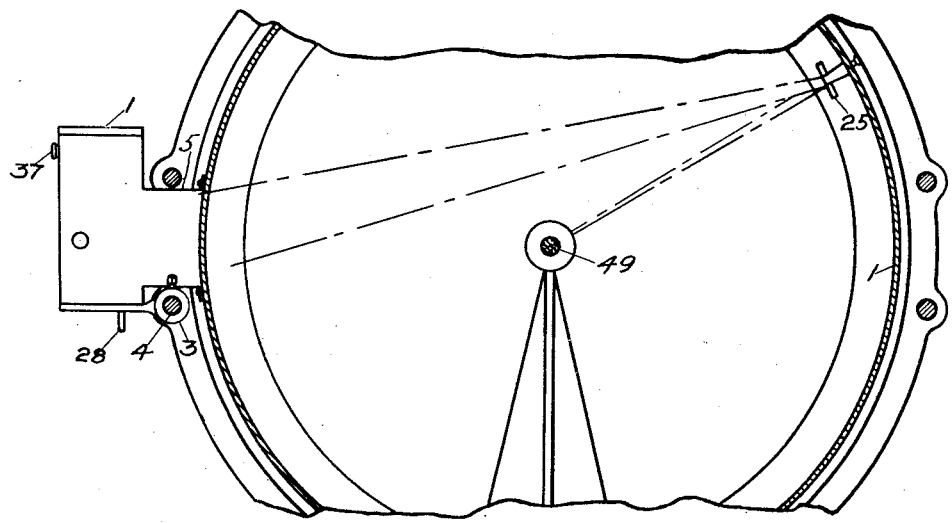

Referring to the drawings in which what I now consider to be the preferred form of my invention is shown: Fig. 1 is a vertical section of a thermostat showing it attached to the searchlight drum. Fig. 2 is a section on line 2, 2 Fig. 1. Fig. 3 is a section on line 3, 3, Fig. 1. Fig. 4 is a diagram showing the action of the feeding device. Fig. 5 is a section on line 5, 5 Fig. 1. Fig. 6 is an enlarged view partly in section of the small auxiliary mirror. Fig. 7 is a section of the searchlight drum, showing the position of the thermostat thereon. Fig. 8 is a view, partly in section and partly diagrammatic, illustrating how my thermostat may be employed to control the position of the positive electrode of a searchlight.

The thermostat, 1, may be secured to the searchlight drum 2 in any suitable manner, as by means of an extension 3 which is clamped to one of the longitudinal rods 4 on the searchlight and by means of an extension 5 secured to the wall of the drum. The thermostat is shown as enclosed in the box 6 within which a slidable carriage 7 supporting the greater part of the mechanism is mounted. The sensitive element or elements of the thermostat consist of a plurality of members or strips 8, 9, which are made of any material having a comparatively large coefficient of expansion. For this purpose, I have found either zinc or hard rubber well suited. The strip 8 is clamped adjacent one end by means of a support 10 and is pivoted adjacent its other end to the short arm 11 of a bell crank lever 12. The clamp 10 is preferably adjustable so that tension on the strip 8 may be varied. This may be accomplished by slidably mounting the clamp 10 on guideway 13 and by threading it on the knurled screw 14.

Element 9 is similarly secured to clamp 15 near one end and to a second bell crank lever 16 adjacent its other end. Springs 17, 18 or other yielding means are provided to place the two elements normally under tension. These springs are shown as secured to a fixed arm 19 adjacent one end and to the levers 12 and 16 respectively adjacent the other end. The free arms 20 of said levers are preferably made much longer than the arms 11 to which the sensitive elements are secured and are provided adjacent their far ends with electric contacts 21, 22 adapted to make contact with one another upon relative differential movement between the two arms, i. e., contact 21 is so placed upon lever 12 as to move away from contact 22 on expansion of member 8, while contact 22 moves toward contact 21 upon expansion of element 9. The long arms 20 are preferably counterbalanced by adjustable masses 211 secured on the opposite side of the pivotal points 221 of the levers. Secured to the carriage 7 is a member 23 fitting within extension 5 and having a slot 24 at its forward end. Member 23 is adapted to shield the interior mechanism of the thermostat from all the rays of the arc except those coming from a predetermined direction, preferably from a small auxiliary mirror 25, as explained hereinafter.

The perpendicular rays coming through slot 24 will fall upon element 8, but element 9 is shielded therefrom as by means of a screen 26. As stated above, the carriage 7 is slidably mounted within the box 6 in guideways 27 so that the thermostat may be adjusted to bring the arc into the exact focus of the mirror or into any other desired position by means of a handle 28 which extends through a slot 29 in the bottom of the casing. An adjustable stop screw 30 may be provided to assist in positioning the carriage, while a clamp screw 31 is shown to lock the carriage in position. For inspecting the condition of the contacts from without the casing I provide a window 32 which may contain a magnifying lens 33. Electrical connections to the feeding mechanism of the searchlight are preferably made upon the interior of the box 1, as by means of screws 34. Current is led into the carriage from these fixed connections by means of contact strips 35 against which spring brushes 36 on the carriage are adapted to bear. In case it should be desired to feed the carbons independently of the thermostat I provide a push button 37 on the casing 1, adapted to close contacts 38, which may be connected to the same feed mechanism as contacts 21, 22.

As stated above, I prefer to employ an auxiliary mirror for focusing a portion of the rays of the searchlight upon the thermostat; (see Figs. 4 and 7). Mirror 25 is preferably made cylindrically concave about an axis parallel to the longitudinal axis of slot 24. The concavity is very slight, but is exaggerated in Fig. 6 to illustrate this feature. The mirror is also preferably angularly adjustable, being pivoted adjacent one end at 40 upon a bracket 41 secured to the drum 2. The other end may be secured to a screw 42 threaded in the bushing 43 in the searchlight drum, so that the direction of the beam reflected from the mirror may be accurately adjusted.

The operation of my device is as follows:—As shown in the Figs. 4 and 7, the beam from the crater 50 or from the immediate vicinity of the positive carbon 49 will be reflected and concentrated by the mirror 25 upon slot 24 and will strike upon the sensitive element 8 when the crater is near the exact focus. According to my preferred construction, the contacts 21, 22 are normally closed when the beam is off element 8, so that the feeding mechanism is then operative, but when the beam strikes element 8, it causes element 8 to become much hotter than the shielded element 9 so that contact 21 will move away from contact 22 and the rate of feeding will immediately be stopped or reduced. Thus referring to Fig. 8, when the thermostat contacts 21, 22 engage, the solenoid S is energized to cause a feed to be imparted to the positive electrode 49 as clearly described in the said application Serial Number 21,661 and in the division thereof which has now matured into United States Letters Patent to E. A. Sperry 1,282,133, October 22, 1918. As will be understood from an inspection of the last mentioned disclosures, when the contacts 21, 22 disengage the solenoid S is deenergized and the feed of the electrode 49 either stops or is materially reduced. When the burning away of the positive carbon has caused the beam to be partly or wholly off of element 8, the feeding mechanism will again feed it forward until the beam falls on the element 8. It will at once be seen that by using the two sensitive elements one of which is shielded from the rays of the arc, that I eliminate all errors and variations in the behavior of the thermostat due to changes of temperature within the thermostat. This, of course, is extremely important, as searchlights are almost invariably used out of doors where they are exposed to great temperature changes, so that with the present type of thermostat, a new adjustment must be made each time the searchlight is used, and furthermore, the temperature inside the box 1 becomes very much higher after the lamp has been running than when it is first started, so that even when the thermostat is adjusted accurately at the beginning of the run it becomes unreliable before the run is over. By my differential arrangement, however, I eliminate all errors due to variations in the temperature of the thermostat.

If it is found that the thermostat has not maintained the arc in exactly the correct position, the carriage 7 may be adjusted as explained, which will at once change the position of the positive carbon as shown in Fig. 4. Thus if it is found that the crater 50 is too close to the projector 51 with the thermostat in the position as shown at 1, by moving the thermostat to position 1′, the positive electrode will either be fed back to the position shown by dotted line A, or will be allowed to burn back to that position, depending upon the type of feeding mechanism employed. A similar result may be obtained by means of the adjustable mirror.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to used the various features and elements in the combination and relations described, some of these may be altered and others omitted without interfering with the more general results outlined, and the invention extends to such use.

Having described my invention, what I claim and desire to secure by Letters Patent is:—

1. The combination with a projector light having a source of light, of a thermostat for maintaining the said source in a predetermined position comprising a plurality of expansible thermostatic elements, at least one of said elements being so situated as to intercept a beam, when the said source is in a predetermined position, while another of said elements is shielded from said beam, and contacts adapted to be closed upon relative expansion or contraction of said elements.

2. The combination with a projector light having a source of light, of a thermostat for maintaining the said source in a predetermined position comprising a plurality of expansible thermostatic elements, at least one of said elements being so situated as to intercept a beam, when the said source is in or near the focus, while another of said elements is shielded from said beam, and contacts adapted to be closed upon differential movement of said elements.

3. In combination, a light condensing device, a source of light movable along the axis of said device, sensitive means responsive to radiant energy from said source when the latter is in a predetermined position for controlling the position of said source along said axis, and means for adjusting said sensitive means with respect to said condensing device to change the position of said source.

4. In combination, an arc light including a source of light, a compound thermostat mounted on said arc light and comprising a plurality of elements, each of said elements comprising an expansible link and a contact lever operatively connected to said link, and means for excluding only heat radiated by said source from one of said links.

5. In combination, an arc light including a source of light, a thermostat comprising a plurality of expansible thermostatic elements, a circuit controller, means connecting said thermostat and controller for actuating the latter when said source is in a predetermined position with relation to said thermostat and means for preventing said thermostat from causing actuation of said circuit controller due to rise in temperature of the arc light.

6. In a searchlight or the like including a source of light, a controller, a thermostat comprising a plurality of expansible thermostatic elements for causing actuation of said controller in response to heat radiated by said source, and means for rendering said thermostat ineffective to cause actuation of said controller due to heat of conduction or convection.

7. In combination, a movable source of light, a thermostatic device comprising a plurality of expansible thermostatic elements for governing the position of said source of light, said device comprising a thermally responsive element exposed to said source of light when the latter is in a predetermined position and a thermally responsive element shielded at all times from said source of light.

8. In combination, an arc light comprising light condensing means, a source of light movable along the axis of said means, sensitive means responsive to radiant energy from said source for controlling the position of said source along said axis, a shield for said sensitive means for selecting predetermined rays from said source and means whereby the position of said sensitive means may be adjusted to change the position of said source.

9. In a searchlight or the like comprising light condensing means, a source of light movable along the axis of said means, feeding-means for moving said source along said axis, a sensitive device responsive to radiant energy for controlling the actuation of said feeding-means for changing the position of said source along said axis, a reflecting device for reflecting rays from said source onto said sensitive device and means for adjusting at least one of said devices to cause the actuation of said feeding-means and change the position of said source.

10. In combination, a projector light including a source of light, a controller, a thermostat comprising a plurality of expansible thermostatic elements for causing actuation of said controller in response to heat radiated by said source, at least one of said elements being shielded at all times from said radiant heat, means for rendering said thermostat ineffective to cause actuation of said controller due to heat of conduction or convection, and means governed by said controller for changing the position of said source with respect to the projector.

11. In a searchlight or the like having a source of light, a thermostat for maintaining said source in a predetermined position comprising a plurality of expansible thermostatic elements, one of said elements being exposed to the temperature of the surrounding medium and the other of said elements being exposed to radiation from said source and to the temperature of the surrounding medium, and contacts adapted to be closed upon differential movement of said elements.

12. In combination, a projector light including a source of light, a controller, a thermostat comprising a plurality of expansible thermostatic elements for causing actuation of said controller in response to heat radiated by said source, at least one of said elements at all times being shielded from said radiant heat while the other is intermittently exposed to said radiant heat for rendering said thermostat ineffective to cause actuation of said controller due to heat of conduction or convection, and means governed by said controller for changing the position of said source with respect to the projector.

In testimony whereof I have affixed my signature.

ARTHUR P. DAVIS.